(12) United States Patent
Ens et al.

(10) Patent No.: US 11,674,972 B2
(45) Date of Patent: Jun. 13, 2023

(54) MEASURING SENSOR

(71) Applicant: Siemens Aktiengesellschaft, Munich (DE)

(72) Inventors: Wolfgang Ens, Linkenheim (DE); Stefan Klehr, Rheinzabern (DE); Stefan von Dosky, Karlsruhe (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 17/277,080

(22) PCT Filed: Sep. 20, 2019

(86) PCT No.: PCT/EP2019/075379
§ 371 (c)(1),
(2) Date: Mar. 17, 2021

(87) PCT Pub. No.: WO2020/058497
PCT Pub. Date: Mar. 26, 2020

(65) Prior Publication Data
US 2022/0034931 A1 Feb. 3, 2022

(30) Foreign Application Priority Data
Sep. 21, 2018 (DE) .......................... 102018216166.6

(51) Int. Cl.
*G01P 1/02* (2006.01)
*G01D 11/30* (2006.01)
*G01H 1/00* (2006.01)

(52) U.S. Cl.
CPC .............. *G01P 1/023* (2013.01); *G01D 11/30* (2013.01); *G01H 1/003* (2013.01)

(58) Field of Classification Search
CPC ............ G01P 1/023; G01P 1/02; G01D 11/30
See application file for complete search history.

(56) References Cited

U.S. PATENT DOCUMENTS

| 6,094,984 A * | 8/2000 | Asano ................. G01P 15/0915 73/514.16 |
| 2002/0084176 A1* | 7/2002 | Flaig ...................... H01H 35/14 200/61.45 R |

(Continued)

FOREIGN PATENT DOCUMENTS

| CN | 1985151 | 6/2007 |
| CN | 105021270 | 11/2015 |

(Continued)

OTHER PUBLICATIONS

PCT International Search Report dated Jan. 3, 2020 based on PCT/EP2019/075379 filed Sep. 20, 2019.

*Primary Examiner* — Helen C Kwok
(74) *Attorney, Agent, or Firm* — Cozen O'Connor

(57) ABSTRACT

A measuring sensor includes a housing in which an acceleration sensor is arranged and in which a circuit board is retained with a sensor electronics arranged thereon and a mounting element functions to secure the measuring sensor to a test object, wherein the acceleration sensor is mechanically rigidly coupled to the mounting element and connected to the sensor electronics via a flexible line connection, where in order to optimize the coupling of the acceleration sensor to the test object to be monitored, in terms of detecting oscillations, vibrations or structure-borne noise, the acceleration sensor is directly connected to the mounting element without mechanical contact with the housing, and the housing is retained elastically on the mounting element and supported by the mounting element.

9 Claims, 3 Drawing Sheets

(56) References Cited

U.S. PATENT DOCUMENTS

| | | | |
|---|---|---|---|
| 2004/0000204 A1* | 1/2004 | Clark | G01D 11/245 |
| | | | 73/866.5 |
| 2008/0072670 A1 | 3/2008 | Brandmeier et al. | |
| 2011/0094303 A1* | 4/2011 | Ohta | G01C 19/56 |
| | | | 73/504.12 |
| 2011/0295545 A1* | 12/2011 | Kant | G05B 23/0254 |
| | | | 702/130 |
| 2014/0096611 A1* | 4/2014 | Lysen | G01H 1/00 |
| | | | 73/649 |
| 2015/0241463 A1* | 8/2015 | Kraige | G01H 1/003 |
| | | | 73/514.29 |
| 2015/0276556 A1 | 10/2015 | Biegner et al. | |
| 2015/0377693 A1 | 12/2015 | Rose | |
| 2016/0041068 A1 | 2/2016 | Wascat et al. | |
| 2017/0082132 A1* | 3/2017 | Ota | G08B 5/00 |
| 2017/0191832 A1* | 7/2017 | Kinoshita | G01P 15/123 |
| 2021/0181226 A1* | 6/2021 | Toivanen | G01P 15/18 |

FOREIGN PATENT DOCUMENTS

| | | |
|---|---|---|
| CN | 205057791 U | 3/2016 |
| CN | 107110732 | 8/2017 |
| CN | 108444587 | 8/2018 |
| DE | 10349398 | 6/2005 |
| WO | WO 2016/110457 | 7/2016 |

\* cited by examiner

MEASURING SENSOR

CROSS-REFERENCE TO RELATED APPLICATIONS

This is a U.S. national stage of application No. PCT/EP2019/075379 filed 20 Sep. 2019. Priority is claimed on German Application No. 10 2018 216 166.6 filed 21 Sep. 2018, the content of which is incorporated herein by reference in its entirety.

BACKGROUND OF THE INVENTION

1. Field of the Invention

The invention relates to a measuring sensor with a housing, in which an acceleration sensor is arranged and in which a circuit board is retained with a sensor electronics arranged thereon and which has a mounting element for securing the measuring sensor to a test object, where the acceleration sensor is mechanically rigidly coupled directly to the mounting element without mechanical contact with the housing and is connected to the sensor electronics via a flexible line connection and where the housing is retained elastically on the mounting element and is supported by mounting element.

2. Description of the Related Art

U.S. Publication No. 2016/0041068 A1 discloses a conventional measuring sensor.

U.S. Publication No. 2015/241463 also discloses a conventional measuring sensor that is used to monitor the oscillations or vibrations of machines, such as pumps, compressors or motors within the scope of condition monitoring. The conventional measuring sensor has a housing consisting of an upper shell and a lower shell. The base of the lower shell consisting of metal contains a threaded bore for receiving a screw-type mounting element, with which the measuring sensor can be secured to the object (test object) to be monitored. Two retaining arms with guide slots are provided in the interior of the lower shell, in the region of the base on opposing sides of the threaded bore, into which guide slots an acceleration sensor, here a MEMS sensor on a small, first, circuit board can be inserted. The acceleration sensor is connected to a sensor electronics on a second circuit board via a flexible line connection. The second circuit board can be arranged between the upper and lower shell and in this way lie on a peripheral shoulder of the lower shell. Both circuit boards and the flexible line connection can be formed as a single, flexible circuit board. The measuring sensor can also be retained with magnetic force on suitable test objects, to which end magnets can further be attached on the base of the lower shell. The lower shell can be cast completely or partially with synthetic resin in order to fix the acceleration sensor and possibly the magnets. The conventional measuring sensor is battery operated and contains a radio unit with antenna.

With the conventional measuring sensor described in US 2016/0041068 A1, the acceleration sensor is inserted directly into a receiving hole of the mounting element. The mounting element is surrounded by a hollow cylinder-shaped lower housing part, between which and an upper housing part receiving the circuit board with the sensor electronics an elastomer part is arranged, which decouples both housing parts in an oscillating manner. Cut-outs are formed in the elastomer part and are used as a plug for the lower ends of the circuit board and the battery.

SUMMARY OF THE INVENTION

It is an object of the invention to optimize the coupling of an acceleration sensor to a test object to be monitored with respect to the detection of oscillations, vibrations or structure-borne noise.

This and other objects are achieved in accordance with the invention by a measuring sensor in which the mounting element is formed as a support that extends through the housing and upon which the housing is suspended.

The essential advantage of the inventive measuring sensor consists, during measuring operation, in only the acceleration sensor being coupled mechanically rigidly with the test body by way of the mounting element, whereas the complete housing of the measuring sensor and the circuit board, retained therein, with the sensor electronics is only coupled softly with the assembly element or with the test body on account of the suspension on the mounting element formed as a support. The vibrating mass is minimized and in light of the negligible mass of the acceleration sensor is determined substantially by the weight of the rigid assembly element.

The housing can be connected to the mounting element via suitable decoupling elements. With a preferred embodiment of the inventive measuring sensor, the oscillation, vibration or structure-borne noise decoupling is realized because the housing, more precisely the wall of the housing, has a material thinning or material attenuation in the close-up range of its securing to the mounting element.

In order to facilitate mounting of the measuring sensor on the test object, the support can advantageously be formed in two parts as a hollow support with an internal guide element, where the acceleration sensor is connected to the hollow support which also supports the housing, and where the inner guide element is configured for securement to the test object. Initially, only the inner guide element can be fixedly mounted to the test object, for instance, and the hollow support with the housing retained thereon is only then slid onto the guide element. Different types of guide element can be used depending on the test object and the local conditions. The simplest case involves a longitudinal screw, which is screwed into a corresponding threaded bore in the test object and in the process clamps the hollow support against the test object. If a securing socket (e.g., a screw socket) is already present on the test body, the guide element can be formed accordingly for securement to this securing socket. The hollow support with the housing retained thereon can be rotated relative to the guide element mounted fixedly on the test body so that the measuring sensor can be aligned differently. This is in particular then advantageous if the measuring sensor contains a radio module (e.g., WLAN, Bluetooth, and/or near field communication (NFC)) with an antenna for wireless transmission of the measuring results to external devices. It is also possible to secure the support to the test body via magnetic force. The hollow support can be clamped against a magnet which can be attached to the test object by means of a screw.

In order to achieve a close and effective oscillation, vibration or structure-borne noise coupling of the acceleration sensor to the test object, on a side facing away from the test object, the support or hollow support in a foot region can contain a cut-out that represents a material thinning and in which the acceleration sensor is arranged. The cut-out with the acceleration sensor contained therein can be cast with a plastic, resin or suchlike, without the vibrating mass of the measuring sensor having to be increased significantly.

In the housing, the measuring sensor can contain further sensors, for instance, for measuring ambient temperature, ambient noises, humidity, gases or air pressure, which are decoupled from the test object in an oscillating manner. Conversely, a temperature sensor for measuring the temperature of the test object together with the acceleration sensor can be connected directly to the mounting element.

In order to measure ambient variables, such as the cited ambient noises, humidity, gases or air pressure, the housing can advantageously have at least one opening which is sealed by a possibly specifically permeable (e.g., breathing-active) membrane, where at least one of the cited further sensors is arranged behind the opening in the housing. The membrane can be easily formed between a wall of the housing containing the opening and the circuit board that lies parallel to the wall of the housing and contains a congruent opening.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

To further explain the invention, reference is made below to the figures of the drawing, which show exemplary embodiments of the inventive measuring sensor in a simplified schematic representation, in which.

DETAILED DESCRIPTIION OF THE EXEMPLARY EMBODIMENTS

Figure 1:
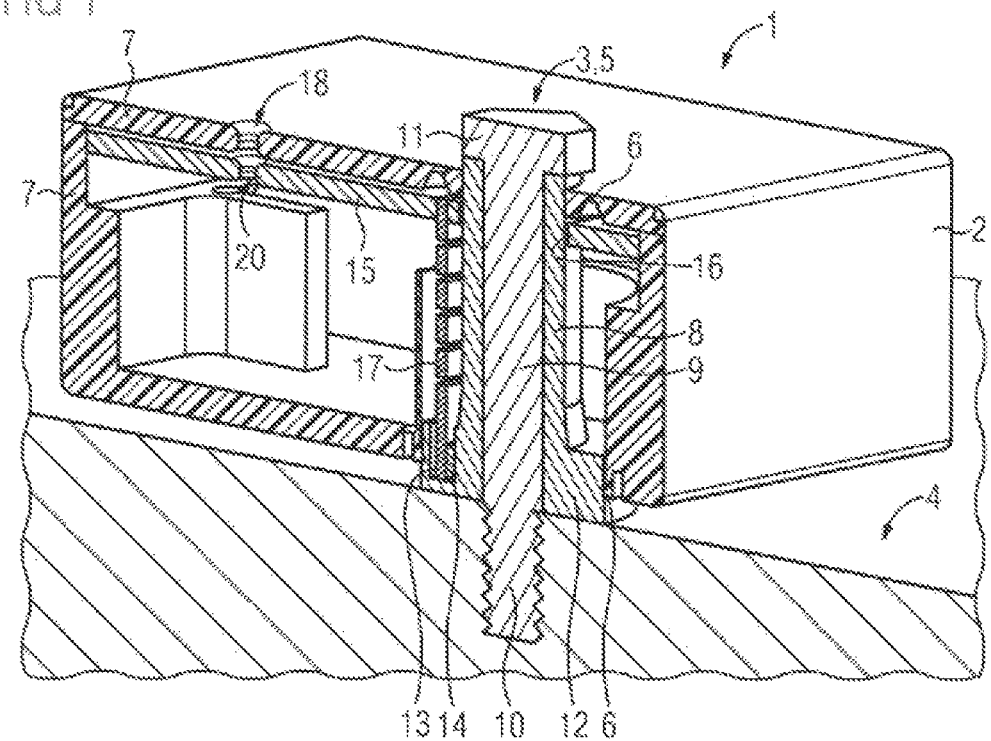
FIG. 1 is an exemplary longitudinal illustration sectional view of the measuring sensor in accordance with an embodiment of the invention.

FIG. 1 shows an exemplary longitudinal section through the inventive measuring sensor 1 with a housing 2, which is mounted on a test object 4, such as a process pipeline, via a mounting element 3. The housing 2 preferably consists of plastic, such as polyvinylidene fluoride, which is characterized by good thermal and chemical stability and is transparent for microwaves in the frequency band used by Bluetooth Low Energy (BLE), for instance.

The mounting element 3 is formed as a support 5 that extends through the housing 2 and upon which the housing 2 is suspended softly via decoupling elements 6. In this way, the housing 2 has no contact with the test body 4. The decoupling elements 6 are formed by material thinnings, e.g., peripheral grooves, in the wall 7 of the housing 2 in the close region of its securing to the support 5. With the soft suspension, the housing 2 is decoupled from the mounting element 3 and thus also from the test body 4 in an oscillating, vibrating and structure-borne noise manner.

Figure 2:
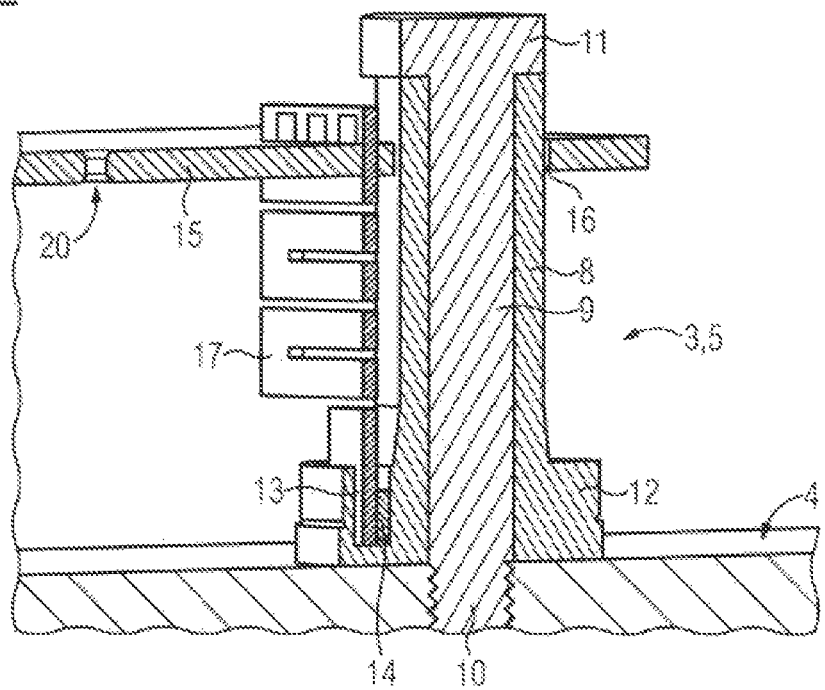
FIG. 2 shows the measuring sensor of FIG. 1 without the housing surrounding the same.

FIG. 2 shows the measuring sensor 1 without the housing 2 surrounding the measuring sensor 1.

Figure 3:
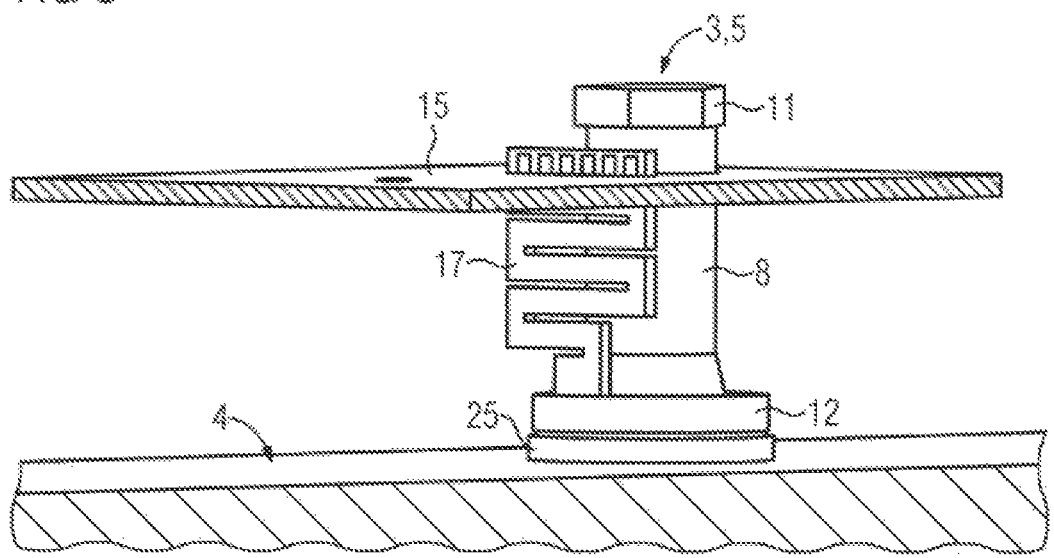
FIG. 3-shows a sectional detail of the measuring sensor of FIG. 2.

FIG. 3 shows a sectional detail of the measuring sensor 1 in the region of the mounting element 3.

As shown in FIG. 3, the support 5 is formed in two parts and consists of an outer hollow support 8, such as an aluminum socket, which is slid onto an inner guide element 9. Both parts are cylindrical and have a shared axis, about which they can be rotated relative to one another. The housing 2 is suspended on the hollow support 8 and the guide element 9 is mounted on the test body 4. The guide element 9 itself is formed as a longitudinal screw that is screwed into a corresponding threaded bore 10 in the test object 4 which, in the process, clamps the hollow support 8 against the test object 4 via its screw head 11. Here, the hollow support 8 is pressed with a support foot 12 onto the test object 4 or against the same.

As FIG. 3 shows, the hollow support 8 can alternatively be fixedly screwed to a magnet 25 via the screw 9, with which magnet 25 the complete measuring sensor 1 can be affixed to the test body 4.

On a side facing away from the test object 4, the support foot 12 here contains, e.g., a pocket-shaped cut-out 13, in which an acceleration sensor 14 together with a temperature sensor (not shown here) is preferably arranged and is fixed via an adhesive or a casting compound. The housing 2 is retained on the support foot 12 in its lower region that is close to the test object 4 via the decoupling elements 6 there, so that the cut-out 13 with the acceleration sensor 14 arranged therein and possibly temperature sensor is located inside the housing 2. A circuit board 15 with a sensor electronics arranged thereupon is retained in its upper region in the housing 2. The circuit board 15 contains a hole 16, through which the mounting element 3 extends without contact with the circuit board 15. The acceleration sensor 14 and possibly temperature sensor are connected to the circuit board 15 or the sensor electronics via a flexible line connection 17.

Further sensors, such as for measuring ambient temperature, ambient noises, humidity, gases or air pressure, can be arranged in the housing 2.

Figure 4:
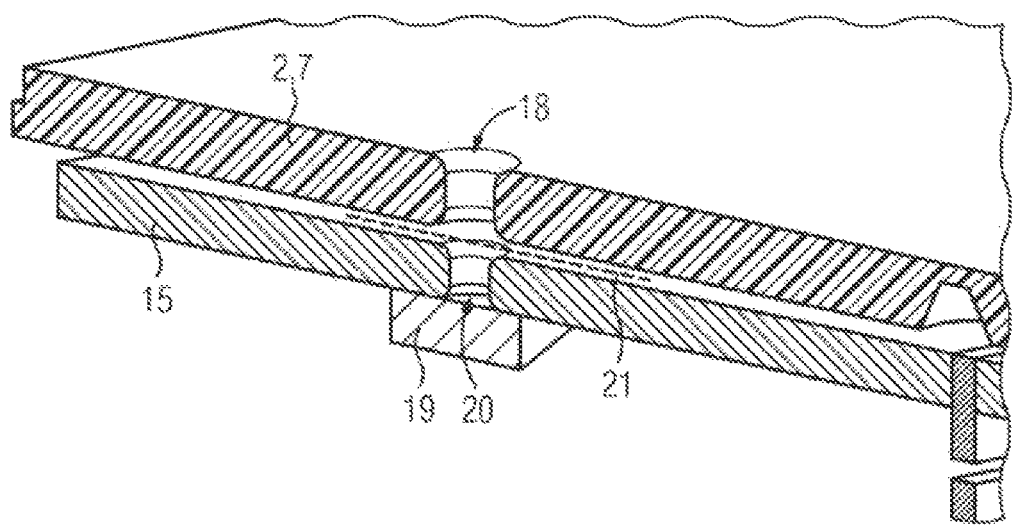
FIG. 4 shows a detail of the measuring sensor of FIG. 1 in the region of an opening in the housing.

FIG. 4 shows by way of example a detail of the measuring sensor 1 in the region of an opening 18 in the wall 7 of the housing 2, behind which one such further sensor 19 is arranged. The further sensor 19 is retained on the lower side of the circuit board 15, which for its part contains a further opening 20 that is flush with the opening 18 in the housing 2. A membrane 21, which outwardly seals the interior of the housing 2 against water, is disposed between the circuit board 15 and the housing wall 7, but is vapor or gas-permeable for the purpose of measuring humidity or gases.

As already mentioned, the housing 2 can be rotated relative to the guide element 9 mounted fixedly on the test body 4 via the hollow support so that during its mounting the measuring sensor 1 can be aligned in a targeted manner.

Figure 5:
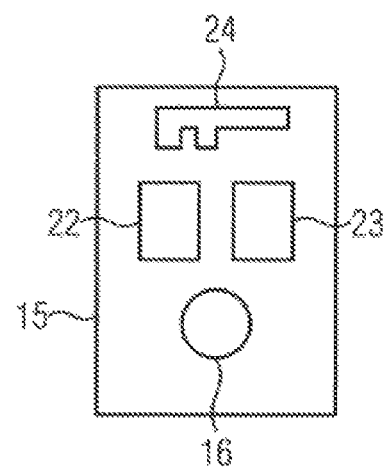
FIG. 5 shows a top view onto a circuit board of the measuring sensor in accordance with the invention with three different alignments of the measuring sensor.
Figure 5:
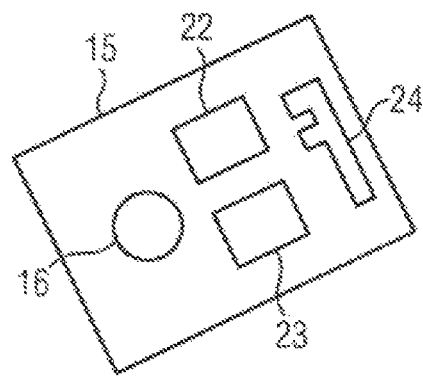
Figure 5:
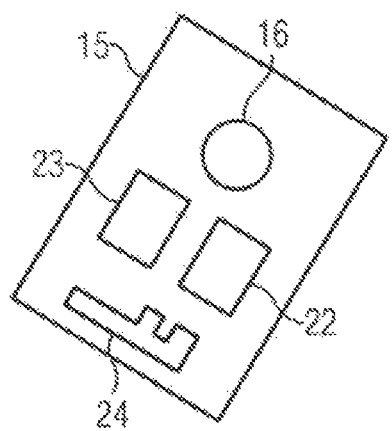

FIG. 5 illustrates this with the aid of a top view onto the circuit board 15 in three different positions. Here, the circuit board 15 is shown with the hole 16, the sensor electronics 22, a radio module 23 and a radio antenna 24, which points in different directions in the three different positions.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A measuring sensor comprising:
a housing;
an acceleration sensor arranged in the housing;
a circuit board having sensor electronics arranged thereon, the circuit board being retained in the housing; and
a mounting element for securing the measuring sensor to a test object, the acceleration sensor being mechanically rigidly coupled directly to the mounting element without mechanical contact with the housing and being connected to the sensor electronics via a flexible line connection, and the housing being elastically retained on the mounting element and being supported hereby;
wherein the mounting element is formed as a two part hollow, cylindrical support with an inner guide element which extend through the housing and upon which the housing is suspended.

2. The measuring sensor as claimed in claim 1, wherein the housing has material weaknesses in regions at which the housing is affixed to the mounting element.

3. The measuring sensor as claimed in claim 1, wherein the acceleration sensor is connected to the hollow support which also supports the housing; and wherein the inner guide element is configured for securement to the test object.

4. The measuring sensor as claimed in claim 2, wherein the acceleration sensor is connected to the hollow support which also supports the housing; and
wherein the inner guide element is configured for securement to the test object.

5. The measuring sensor as claimed in claim 3, wherein the inner guide element includes a screw for clamping the hollow support against the test object.

6. The measuring sensor as claimed in claim 3, wherein the inner guide element includes a screw for clamping the hollow support against a magnet which is fixable to the test object.

7. The measuring sensor as claimed in claim 3, wherein one of (i) the support and (ii) the hollow support in a foot region on a side facing away from the test object includes a cut-out in which the acceleration sensor is arranged.

8. The measuring sensor as claimed in claim 1, wherein the housing includes at least one opening closed by a membrane and at least one further sensor arranged in the housing behind the opening, said at least one further sensor detecting an ambient variable.

9. The measuring sensor as claimed in claim 8, wherein the membrane is formed between a wall of the housing containing the opening and the circuit board containing a congruent opening which is parallel thereto.

* * * * *